United States Patent
Elwell et al.

(10) Patent No.: US 10,310,544 B2
(45) Date of Patent: Jun. 4, 2019

(54) MOTORCYCLE CLUTCH HOLDING DEVICE

(71) Applicant: David Ott, Ankeny, MA (US)

(72) Inventors: James P. Elwell, Grimes, IA (US); David Ott, Ankeny, IA (US); Diane Ott, Ankeny, IA (US); Trent Quick, Des Moines, IA (US); John Wagner, Des Moines, IA (US); Paul Thomas Adair, Des Moines, IA (US); Chris Harrison, Ames, IA (US)

(73) Assignee: David Ott, Ankeny, IA (US)

( * ) Notice: Subject to any disclaimer, the term of this patent is extended or adjusted under 35 U.S.C. 154(b) by 0 days.

(21) Appl. No.: 15/703,618

(22) Filed: Sep. 13, 2017

(65) Prior Publication Data
US 2018/0015981 A1 Jan. 18, 2018

Related U.S. Application Data

(63) Continuation-in-part of application No. 15/422,712, filed on Feb. 2, 2017, now Pat. No. 9,783,258.
(Continued)

(51) Int. Cl.
*G05G 5/06* (2006.01)
*B62K 23/02* (2006.01)
(Continued)

(52) U.S. Cl.
CPC .............. *G05G 5/06* (2013.01); *B62K 11/14* (2013.01); *B62K 23/06* (2013.01); *B62L 3/02* (2013.01); *B62L 3/06* (2013.01); *F16D 28/00* (2013.01)

(58) Field of Classification Search
CPC ........ B62K 11/14; B62K 23/00; B62K 23/02; B62K 23/06; F16D 23/12; F16D 28/00;
(Continued)

(56) References Cited

U.S. PATENT DOCUMENTS

| 2,149,262 A | 3/1939 | Ahler |
| 3,335,621 A | 8/1967 | Buchwald |

(Continued)

FOREIGN PATENT DOCUMENTS

| CN | 101074708 A | 11/2007 |
| EP | 0764574 A1 | 3/1997 |

*Primary Examiner* — Adam D Rogers
(74) *Attorney, Agent, or Firm* — McKee, Voorhees & Sease, PLC

(57) ABSTRACT

On a motorized vehicle with handlebars and handlebar mounted levers, a motorcycle lever retention system includes a button operatively connected to and capable of toggling a rocker switch, a clutch or brake lever having a retracted position and an extended, biased position, a clutch or brake operatively connected to the clutch or brake lever such that the clutch is disengaged or the brake is engaged when the clutch or brake lever is moved into the retracted position, and a mechanism operatively attached to the rocker switch and configured such that when the button is pressed, the rocker switch is toggled causing the mechanism to prevent the clutch from being engaged or the brake from being disengaged and the clutch or brake lever from moving back into the extended, biased position until the button is pressed again.

15 Claims, 19 Drawing Sheets

Related U.S. Application Data

(60) Provisional application No. 62/363,564, filed on Jul. 18, 2016.

(51) Int. Cl.
  *B62L 3/02* (2006.01)
  *F16D 28/00* (2006.01)
  *B62K 23/06* (2006.01)
  *B62L 3/06* (2006.01)
  *B62K 11/14* (2006.01)

(58) Field of Classification Search
  CPC ... B62L 3/02; B62L 3/023; B62L 3/06; G05G 1/04; G05G 5/06
  See application file for complete search history.

(56) References Cited

U.S. PATENT DOCUMENTS

| | | | |
|---|---|---|---|
| 3,720,111 A | 3/1973 | Guyton | |
| 3,733,922 A | 5/1973 | Tripp | |
| 3,856,123 A | 12/1974 | Kinsey | |
| 3,896,680 A | 7/1975 | Shoemaker | |
| 4,175,648 A * | 11/1979 | Sule | B62L 1/10 |
| | | | 188/344 |
| 4,316,531 A | 2/1982 | Harpster | |
| 4,364,283 A | 12/1982 | Ricardo | |
| 4,704,044 A | 11/1987 | Yoshigai | |
| 5,287,766 A * | 2/1994 | Nagano | B62K 23/06 |
| | | | 74/502.2 |
| 5,775,167 A | 7/1998 | Maletta | |
| 6,227,342 B1 | 5/2001 | Armbruster et al. | |
| 6,389,928 B1 | 5/2002 | Kobayashi et al. | |
| 6,945,376 B1 | 9/2005 | Hunter | |
| 7,219,573 B2 | 5/2007 | Dal Pra' | |
| 7,600,447 B2 | 10/2009 | Burner et al. | |
| 7,735,392 B2 | 6/2010 | Poulos, Jr. | |
| 7,992,690 B2 | 8/2011 | Cross | |
| 8,096,921 B2 | 1/2012 | Hahn | |
| 8,201,476 B2 | 6/2012 | Tsumlyama | |
| 8,496,092 B2 * | 7/2013 | Furuse | B60T 7/104 |
| | | | 188/24.18 |
| 8,505,673 B2 | 8/2013 | Bowers | |
| 8,726,758 B2 * | 5/2014 | Furuse | B60T 7/104 |
| | | | 188/24.18 |
| 9,056,649 B2 | 6/2015 | Gohr et al. | |
| 9,284,011 B2 | 3/2016 | Aguilar | |
| 9,381,971 B2 | 7/2016 | Miki | |
| 9,511,815 B2 | 12/2016 | Hirotomi | |
| 2006/0071542 A1 | 4/2006 | Lichtensteiger et al. | |
| 2007/0151395 A1 | 7/2007 | Barnett | |
| 2008/0047768 A1 | 2/2008 | Cross | |
| 2008/0098848 A1 | 5/2008 | Dal Pra' | |
| 2009/0139823 A1 | 6/2009 | Dyer | |
| 2010/0307856 A1 | 12/2010 | Hahn | |
| 2013/0069355 A1 | 3/2013 | Gohr et al. | |
| 2015/0020638 A1 | 1/2015 | Oakes et al. | |
| 2015/0284046 A1 | 10/2015 | Aguilar | |

* cited by examiner

MOTORCYCLE CLUTCH HOLDING DEVICE

CROSS REFERENCE TO RELATED APPLICATIONS

The Present application is a Continuation in Part of co-pending U.S. patent application Ser. No. 15/422,712, filed on Feb. 2, 2017, which claims priority to U.S. Provisional Patent Application Ser. No. 62/363,564, filed on Jul. 18, 2016. The entire contents of these patent applications are hereby expressly incorporated herein by reference including, without limitation, the specification, claims, and abstract, as well as any figures, tables, or drawings thereof.

FIELD OF THE INVENTION

The present invention is directed to an apparatus, and method to restrain clutch and brake levers in a desired position. Preferably, the present invention is intended for use on motorcycles, four wheelers, three wheelers, and other motorized vehicles on which clutch and brake levers are standard equipment.

BACKGROUND OF THE INVENTION

Motorcycles, motorized tricycles, three wheelers and four wheelers are examples of motorized vehicles that typically use handlebar mounted clutch and brake mechanisms. Typically, a rider will pull a lever towards the handlebar to either disengage the clutch or to engage a brake. Both the clutch and the brake levers are typically biased towards an extended position with the lever located further from the handlebar. To disengage the clutch, the clutch lever must be pulled in towards the handlebar. Similarly, to engage the brake, the brake lever must be pulled in towards the handlebar. During travel, a rider may wish to have the clutch disengaged and/or the brake engaged for a lengthy period of time. For example, at a stop light, a motorcycle rider can either down shift to neutral, requiring an upshift to first gear prior to departure. However, this option is undesirable as the rider must shift the weight of the motorcycle onto their right foot while simultaneously pulling the clutch lever in and shifting into first gear before the motorcycle can start moving again. This weight shifting, clutch pulling and gear shifting process is time consuming and causes a delay before the motorcycle can begin accelerating again.

This can cause a substantial safety issue, especially when the motorcycle is sifting at a stop light that just turned green and traffic is bearing down on the motorcycle from behind. In addition, this weight shifting, clutch pulling and gear shifting process is a balancing act that requires substantial adeptness and skill. If performed improperly the motorcycle can fall over injuring the rider and any passenger not to mention causing damage to the motorcycle. This process is made substantially more complicated when a passenger is on board because if they shift their weight while the rider only has one foot on the ground this can cause the motorcycle to tip over.

As an alternative, the rider can down shift into first gear and maintain the clutch in a disengaged position. This allows the rider to have full use of their left foot during the wait time. That is, while the rider is waiting the motorcycle is in first gear and is ready to start moving as soon as the clutch lever is released. This allows the rider use of their left foot for balancing the motorcycle while waiting. Obviating the need to shift into first gear allows the rider to start moving faster. Doing so requires the rider to maintain pressure on the desired lever, which, over lengthy periods of time can cause strain in the rider's hand. In order to provide the rider some relief during long periods of rest, it is desirable to have a device which can restrain either the clutch lever or the brake lever, as desired, and provide rest to the rider's hands.

Others have attempted to provide a solution to the fatigue problem presented above. However, each of these prior art devices suffer from various disadvantages such as being overly complex, failing to be convenient to use, failing to be usable with various devices, being bulky, being expensive, being unattractive, requiring implementation at the factory, among countless other deficiencies. For example, Chinese Patent No. 101074708 A, which was published on Nov. 21, 2007, discloses a complicated automatic control system that requires a processing unit, a wide variety of sensors, and alteration to the clutch mechanism itself.

Others have also tried similarly complicated devices, as shown in U.S. Pat. No. 3,896,680 to Mr. Shoemaker, which issued on Jul. 29, 1975, and U.S. Pat. No. 4,316,531, which issued to Mr. Harpster on Feb. 23, 1982. Both of these systems restrain the clutch lever through significant modification to the clutch lever and its related hardware. These systems must either be professionally installed or require the rider to disassemble, modify, and reassemble the clutch lever on their motorcycle, which can present significant issues. It is therefore desirable to have a clutch and/or brake lever retention device that is easy to install and easy to use and that does not require modification of the clutch or brake levers themselves.

U.S. Patent Application Publication No. US 2009/0139823 A1 to Dyer, which was published on Jun. 4, 2009, attempts to address some of these problems. The Dyer application discloses a clutch lever assist mechanism that does not require modification to the clutch or brake levers. However, the Dyer publication presents many other problems. One example of the device in the Dyer publication's problems is that the Dyer publication device rotates about a fixed pivot point that is both parallel to the handlebar axis and is above the handlebar in order to restrain the clutch lever from above. This arrangement relies on the lever to apply a force to keep the restraint in place.

Removing the restraint in the Dyer publication requires a rider to pull back on the clutch lever, but the Dyer publication device restrains the clutch lever directly against the handlebar making release of the device difficult. Finally, the Dyer publication device includes a selective locking mechanism that rotates into place and allows the rider to lock the clutch lever in a disengaged position. If the lock mechanism gets stuck or brakes, the Dyer publication device can unintentionally restrain the clutch lever in a disengaged position when not desired. It is there for desirable to have a clutch and brake restraining device that includes a variety of safety structures to ensure usability of the motorcycle is not impaired.

Accordingly, it is an objective of the claimed invention to overcome one or more of the problems of the prior art and to improve on the state of the art.

Another object of the present invention is a lever restraint device which does not require modification of a clutch of brake lever.

Another object of the present invention is a lever restraint device which does not require significant tooling for installation.

Another object of the present invention is a lever restraint device which can be easily installed by the rider.

Another object of the present invention is a lever restraint device which is easy to use.

Another object of the present invention is a lever restraint device which provides a variety of safety features to ensure the rider is able to engage and disengage the restraining device when desired.

Yet another object of the invention is to provide a clutch assistance system and method of use that reduces or eliminates the wait time needed to shift gears.

Another object of the invention is to provide a clutch assistance system and method of use that has a robust design.

Yet another object of the invention is to provide a clutch assistance system and method of use that improves the efficiency of riding.

Another object of the invention is to provide a clutch assistance system and method of use that can be used on a wide variety of motorcycles and power sport systems.

Yet another object of the invention is to provide a clutch assistance system and method of use that has a long useful life.

Another object of the invention is to provide a clutch assistance system and method of use that has a small footprint.

Yet another object of the invention is to provide a clutch assistance system and method of use that is high quality.

Another object of the invention is to provide a clutch assistance system and method of use that is durable.

Another object of the invention is to provide a clutch assistance system and method of use that can be installed on practically any motorcycle or other power sport vehicle.

Another object of the present invention is a lever restraint device which includes a variety of safety features that will not interfere with the normal operation of the motorcycle.

These and other objects, features, or advantages of the present invention will become apparent from the following specification, figures, and claims.

BRIEF SUMMARY OF THE INVENTION

The present invention preferably includes a lever assistance system that helps to hold the clutch in a retracted or disengaged position when an operator is sitting at an idle position. The system is preferably compatible with practically any motorcycle or other power sport device that has a lever activated clutch and may be sold as part of a kit that includes a variety of handlebar and lever adapters, spacers, or inserts. The system preferably includes a collar or clamp that fits around the grip or handlebar having a thumb button operatively connected to a switch operatively connected to a lever catch and a mechanism. The mechanism may be an electro mechanical mechanism, such as a solenoid assembly, a servo, a motor and gear assembly, magnetics, or any other transducer device capable of converting energy into linear motion to move the slider from a slider first position to a slider second position, or the mechanism may be a valve capable of preventing the movement of hydraulic fluid within hydraulic lines hydraulically connecting the clutch or brake of a motorcycle with the lever that activates the clutch or the brake.

In one embodiment, the catch slides in a groove to a desired position. In the desired position, the catch is restrained by a notch, detent, slot, or other disruption in the groove. Preferably, the catch is biased toward a disengaged position by the electro mechanical mechanism.

In another embodiment, the thumb button may be compressed or decompressed such that it alternates between an original position where the lever catch is clear from the clutch or brake lever and a partially compressed position where the lever catch engages the clutch or brake lever and holds it in a retracted position.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION OF THE INVENTION

The following definitions and introductory matters are provided to facilitate an understanding of the present invention.

Numeric ranges recited within the specification, including ranges of "greater than," "at least," or "less than" a numeric value, are inclusive of the numbers defining the range and include each integer within the defined range.

The singular terms "a," "an," and "the" include plural referents unless context clearly indicates otherwise. Similarly, the word "or" is intended to include "and" unless the context clearly indicate otherwise. The word "or" means any one member of a particular list and also includes any combination of members of that list.

Figure 1:
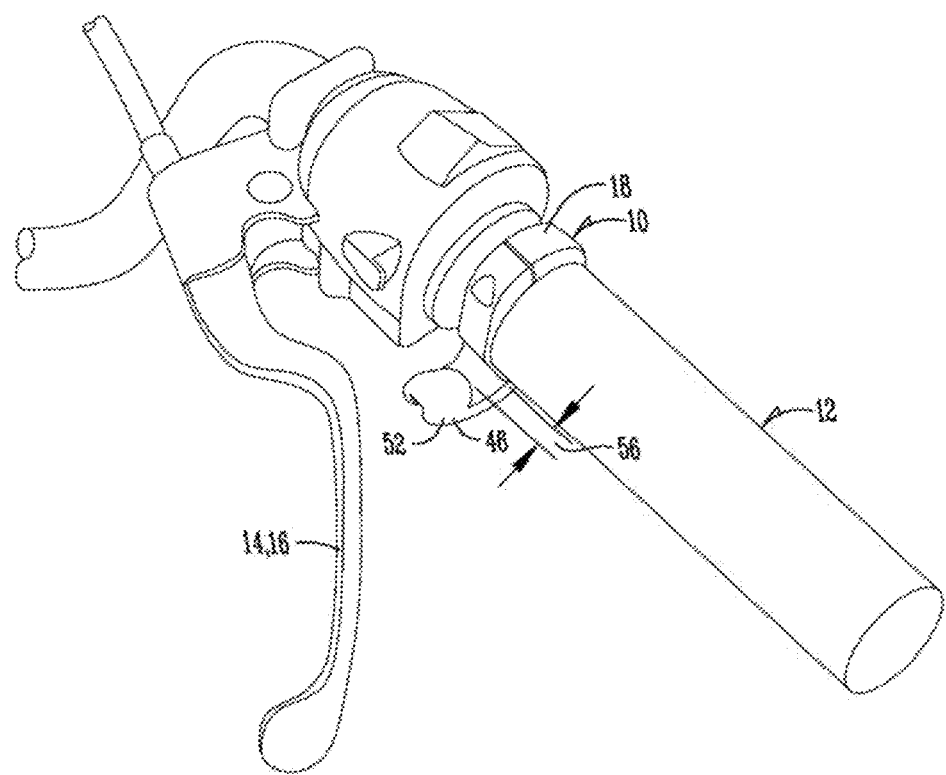
FIG. 1 shows a perspective view of the restraining device in a first position where is it not engaging the clutch or brake lever.
Figure 2:
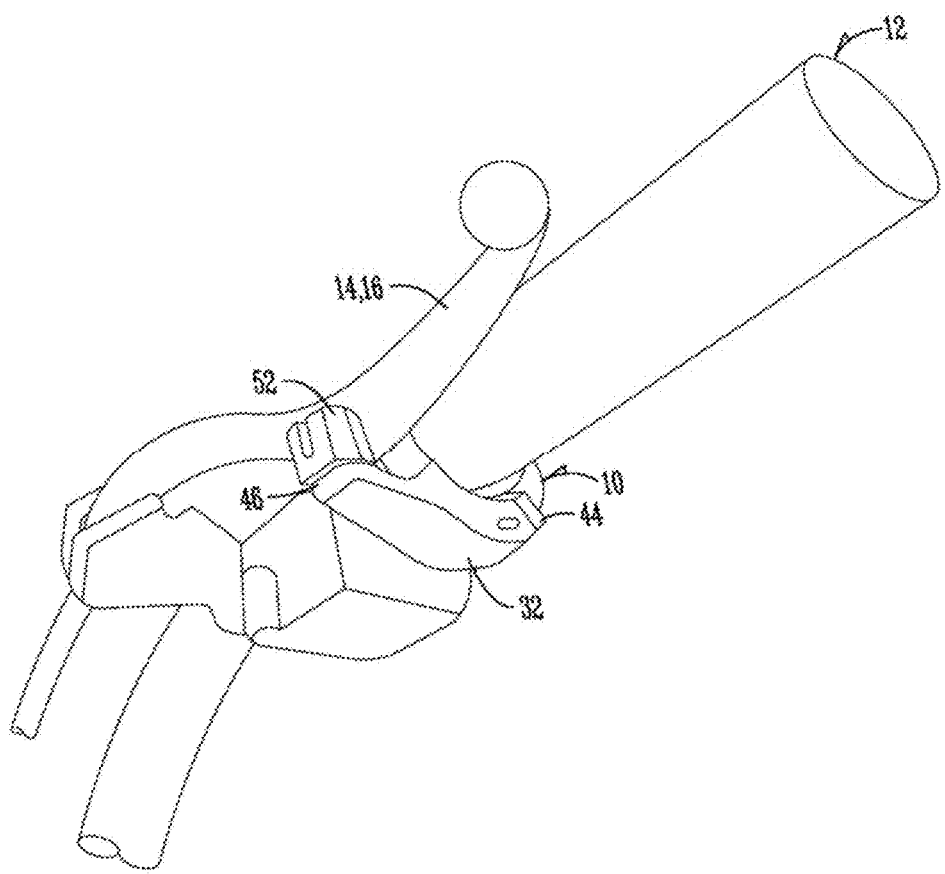
FIG. 2 shows a lower perspective view of the restraining device engaging the clutch or brake lever.

One example of the present invention is shown in FIGS. 1 and 2. This example will be described as being used on a motorcycle, but it is to be understood that the present invention can be employed on a variety of vehicles with handlebars and associated levers. A motorcycle typically has a clutch/brake lever 14/16 on a handlebar 12. The clutch/brake lever 14/16 is typically biased away from the handlebar 12. Away from the handlebar 12, in a released position, the brake lever 16 is disengaged while the clutch lever 14 is engaged. When pulled towards the handlebar 12 in a retracted position, the brake lever 16 is engaged, causing the motorcycle to brake and when pressure is maintained on the brake lever 16, the motorcycle remains in a braked condition.

Similarly, but conversely, when the clutch lever 14 is away from the handlebar 12 in a released position, the clutch is engaged, allowing the motor to engage the transmission and ultimately turn a wheel. When the clutch lever 14 is pulled towards the handlebar 12 in a retracted position, the clutch is disengaged, allowing the rider to shift gears on the motorcycle. Maintaining the clutch lever 14 in a disengaged position allows the rider to keep the motorcycle in first gear while resting, thus being prepared for departure without a need to shift out of a neutral position, making for a quicker departure.

The present invention maintains the clutch/brake lever 14/16 in a retracted position, allowing a rider to release the rider's grip on the clutch/brake lever 14/16, while the clutch/brake lever 14/16 remains in a retracted position. To accomplish this, this embodiment of the present invention includes a clamp 18 secured to a motorcycle handlebar 12. The clamp 18 surrounds the handlebar 12 and is preferably pressure fit around the handlebar 12.

Figure 3:
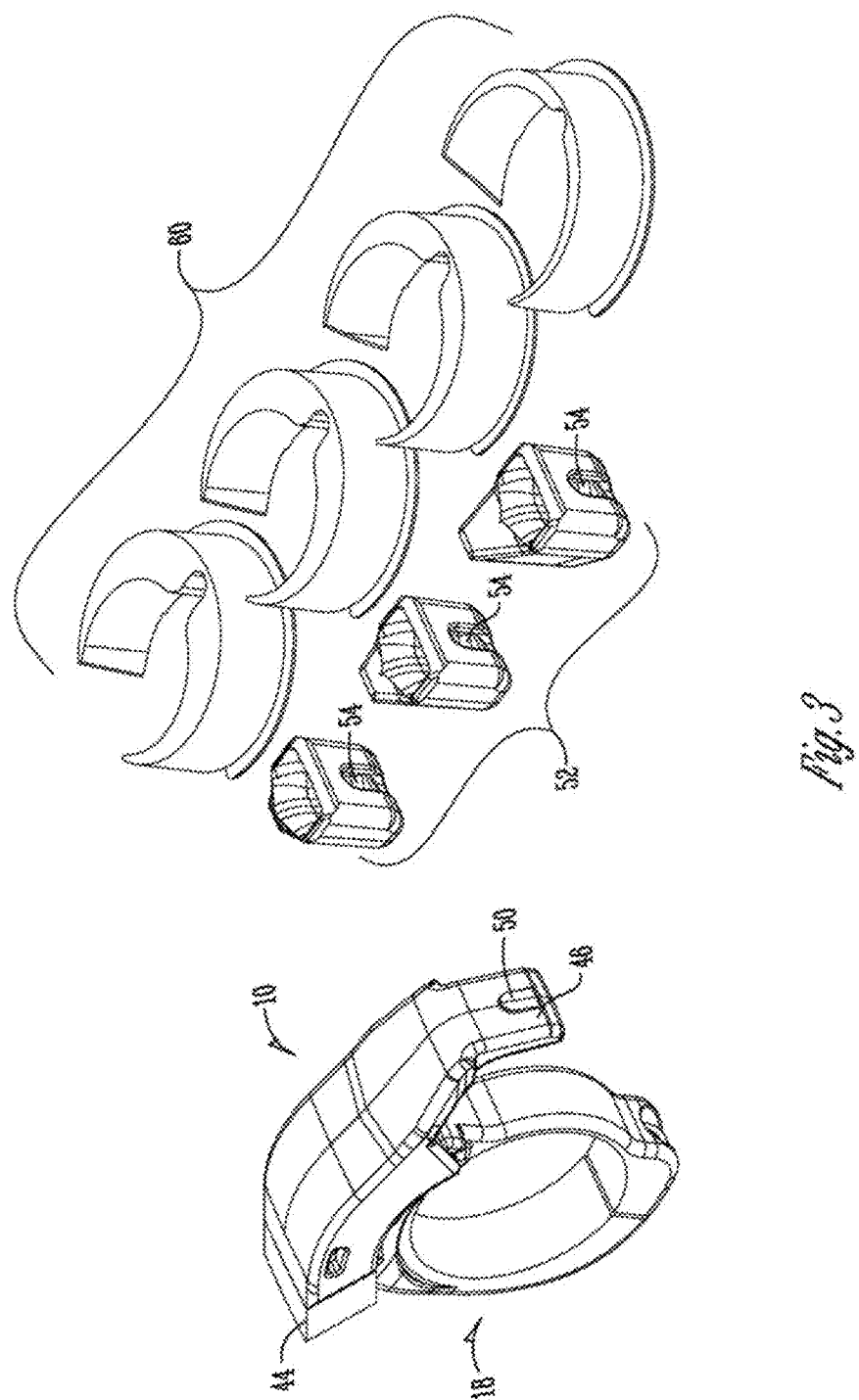
FIG. 3 shows a perspective view of the restraining device kit.
Figure 14:
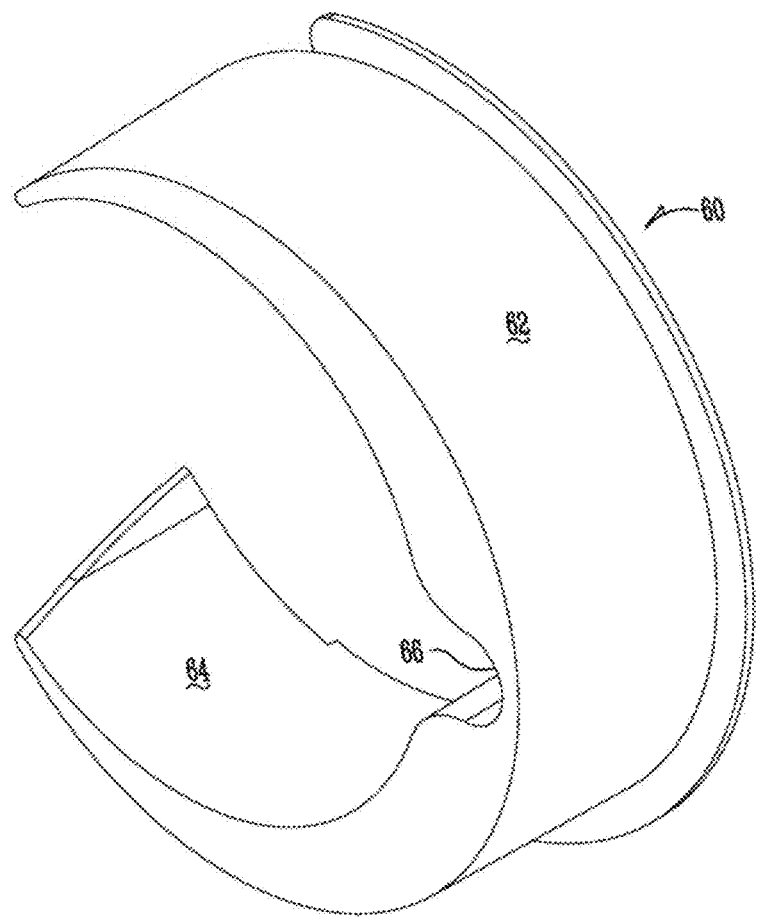
FIG. 14 shows a side view of the spacer of one embodiment of the present invention.

As is shown in FIG. 3, handlebars 12 may have a variety of diameters, so spacers 60 are preferably provided to allow for the device 10 to fit a variety of handlebars 12. Each of these spacers 60, an example of which is shown in FIG. 14, includes an exterior surface 62 that fits inside the clamp 18 and an interior surface 64 that contacts the handlebar 12. To accommodate placing of the spacer 60 into the interior of the clamp 18, the spacer 60 includes a flexible portion 66 that bends to allow the spacer 60 to be inserted inside of the diameter of the clamp 18.

The clamp 18 is preferably made of plastic, but may be made of metal, composites, or any other material strong enough to remain secured in place around the handlebar 12 and to support the motorcycle lever retention slider 32.

Figure 5:
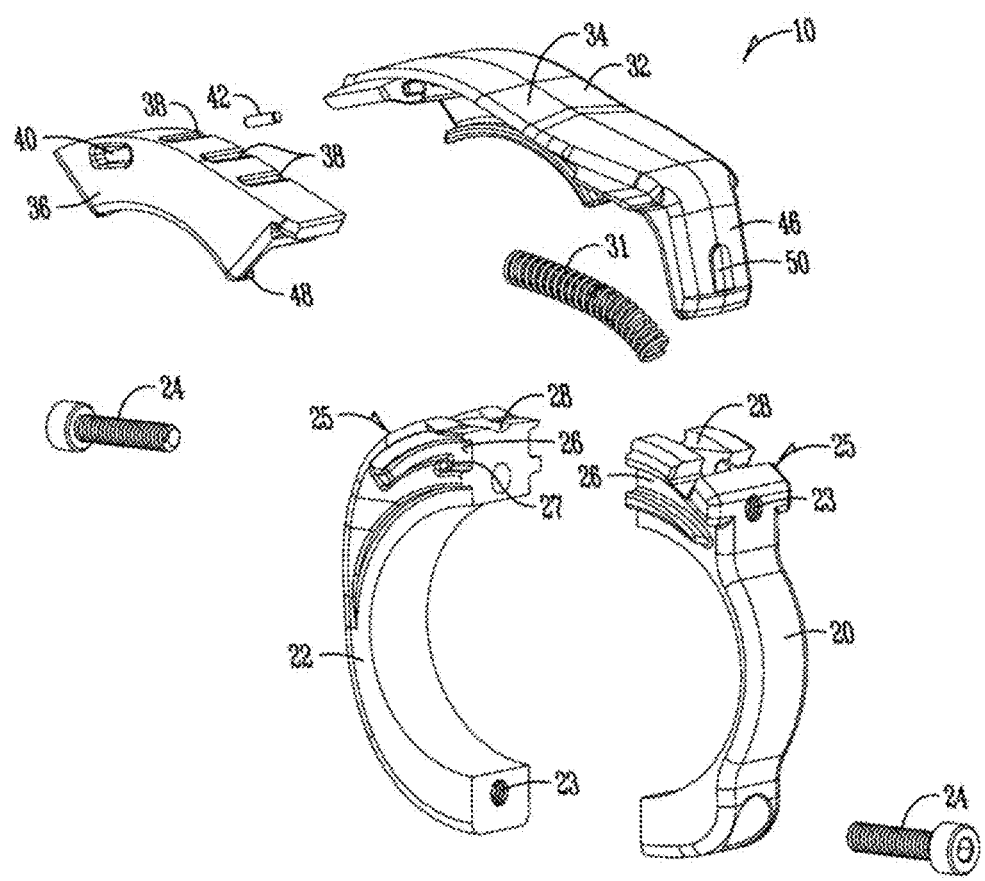
FIG. 5 shows a perspective exploded view of the various components in the restraining device.
Figure 6:
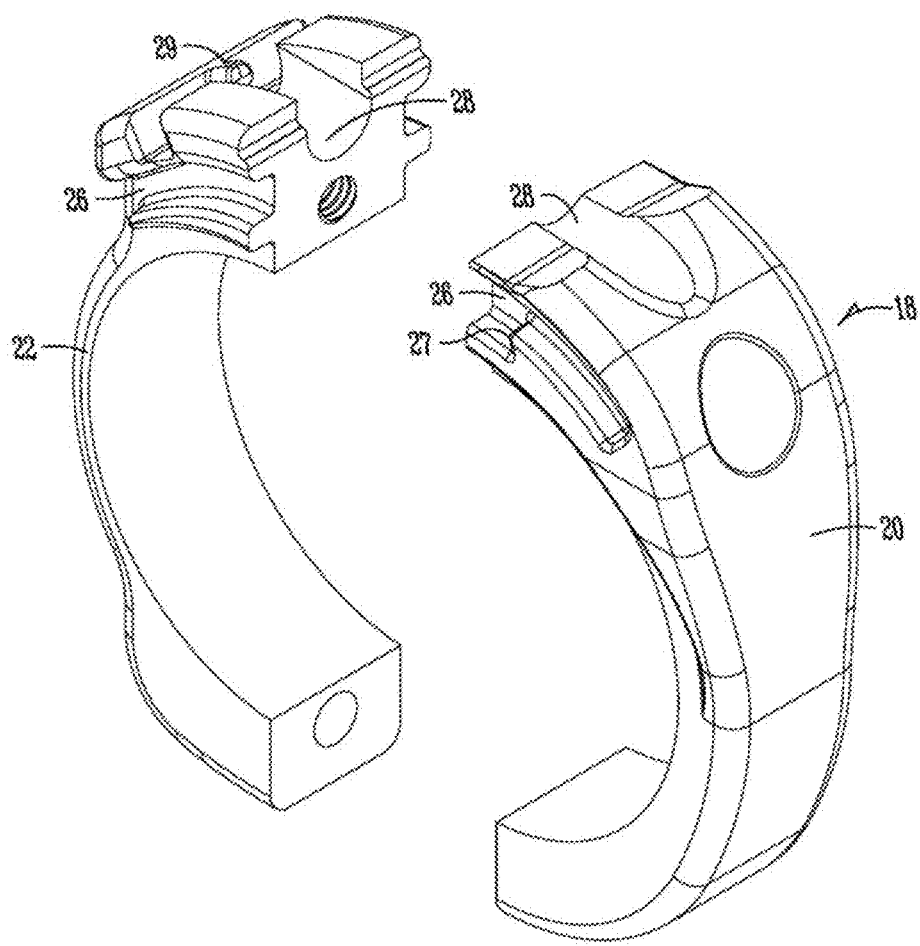
FIG. 6 shows a perspective view of the ring portion of one embodiment of the present invention.
Figure 7:
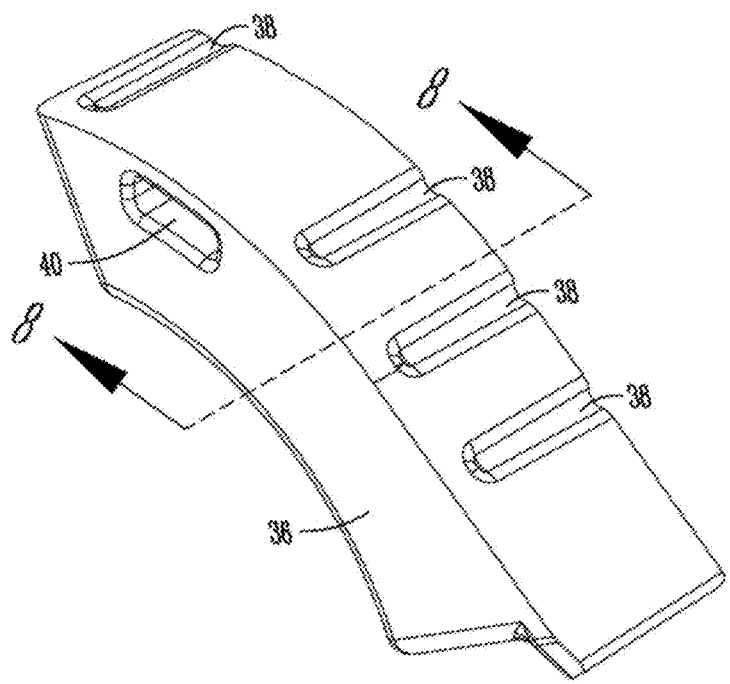
FIG. 7 shows a perspective view of a portion of the sider of one embodiment of the present invention.
Figure 8:
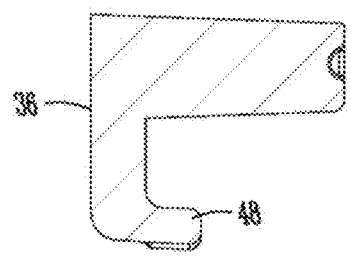
FIG. 8 shows a cross section of the slider of FIG. 7 taken along line 8-8.

Preferably, as shown in FIGS. 5 and 6, the clamp 18 is of two-piece construction with halves 20, 22 secured together by screws 24 mating with correspondingly threaded screw holes 23. While a two-piece construction is shown, the clamp 18 may be made of a single piece with an adjustable section, such as a belt, screw clamp, zip tie, etc. As shown, the two halves 20, 22 of the clamp 18 are placed around the handlebar 12 and screwed together to tightly secure the device 10 around the handlebar 12.

In this embodiment, as shown in FIGS. 5 and 6, the clamp 18 includes an extended portion 25 that supports a channel 26. Preferably, the channel 26 includes a notch 27. The notch 27 provides an interruption in the channel 26 that may be in the form of a detent, a hole, or other physical interruption in the otherwise smooth channel 27.

Figure 4:
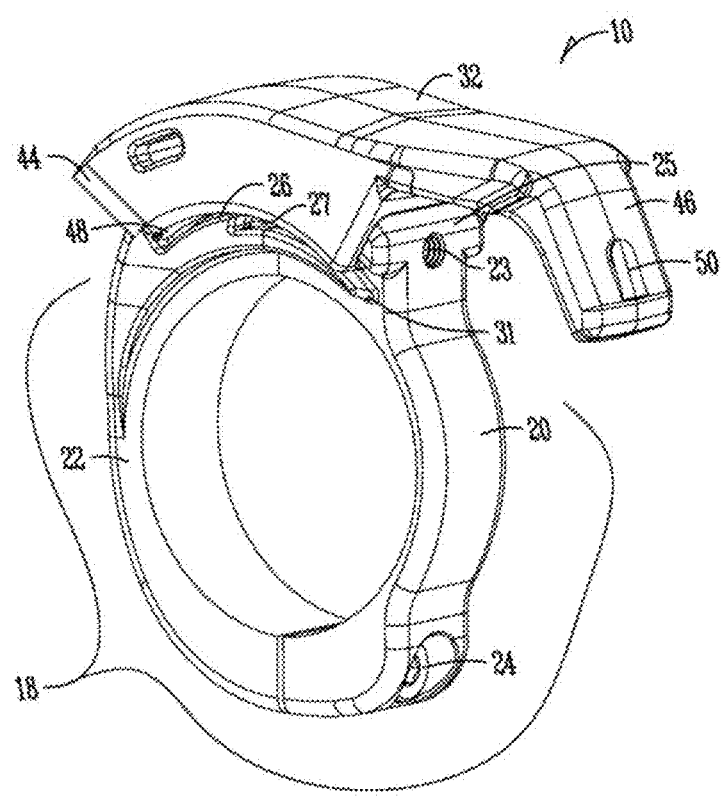
FIG. 4 shows a perspective view of one embodiment of the restraining device.

As shown in FIG. 4, a slider 32 rides on top of the extended portion 25 of the clamp 18. The slider 32, as shown in FIGS. 5, 7, 8, 9, 10, and 11, includes a slider main body 34 (shown in FIGS. 9, 10, and 11), a slider side panel 36 (shown in FIGS. 7 and 8) with slots 38 and a vent 40. The slots 38 help to ensure the slider side panel 36 is properly fit onto the slider main body 34. The slider main body 34 and the slider side panel 36 may be secured together using glue, over molding, welding, or a pin 42 as shown and as desired for the material used in the device 10.

Figure 9:
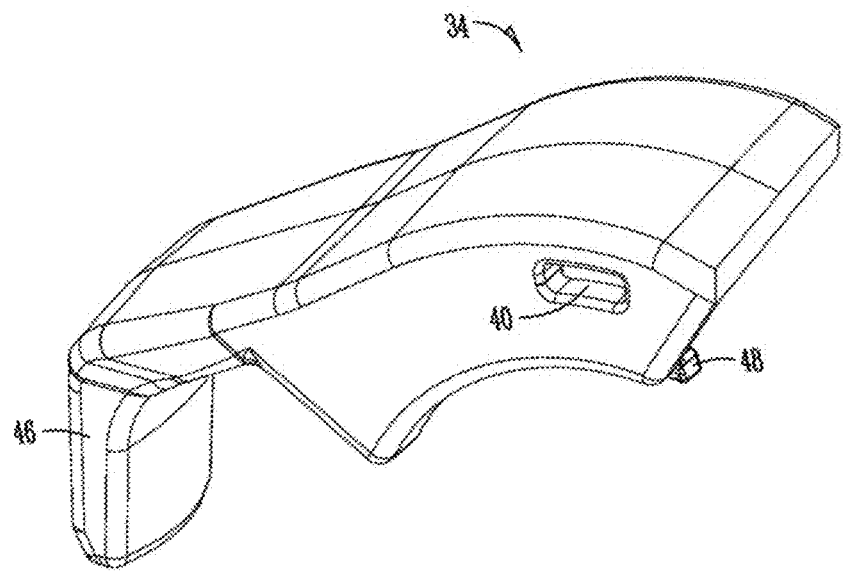
FIG. 9 shows a perspective view of the slider with the thumb button removed so that the rail may be seen.
Figure 10:
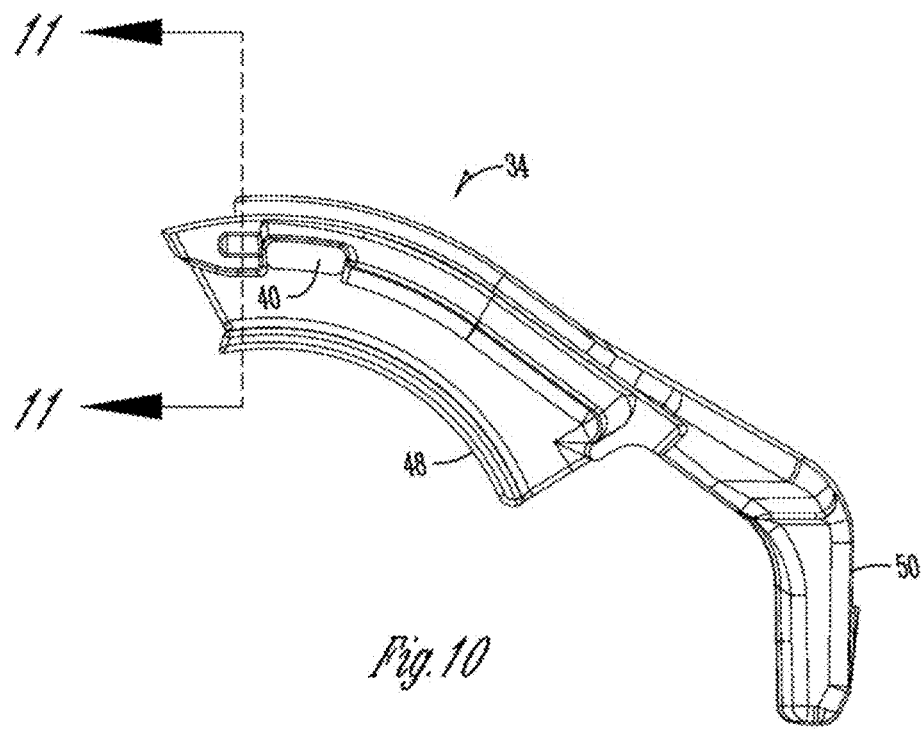
FIG. 10 shows a side view of the slider of FIG. 9 according to one embodiment of the present invention.
Figure 11:
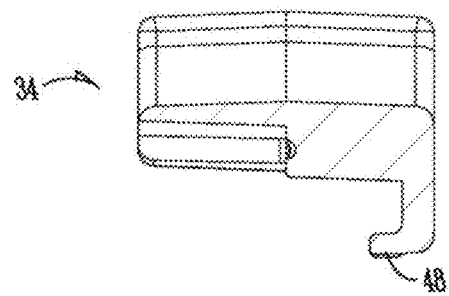
FIG. 11 shows a cross sectional view of the slider of FIG. 10 taken along line 11-11.

As shown in FIG. 9, the slider main body 34 includes a lever retention extension portion 46. Running along the lower portion of slider main body 34 is a rail 48. The slider 32 may have a slider first side (provided in this example by the slider main body 34) and a slider second side (provided in this example by the slider side panel 36 shown in FIGS. 7 and 8) and may have a rail 48 on each of the slider first side and the slider second side. As is shown in FIG. 4, the rail 48 is slidably secured in the channel 26 to travel in a circumferential direction about the handlebar 12.

As shown in FIGS. 1 and 2, the slider 32 has a slider first position and a slider second position. In the slider first position, shown in FIG. 1, the slider 32 is located about the clamp 18 in a position where the rail 48 is not engaged by the notch 27. In the slider first position, the lever retention extension 46 is in the lever retention extension first position and the motorcycle lever 14/16 is not engaged by the device 10. The gap 56 between the handlebar 12 and the lever retention extension 46 is shown.

The rider can move the slider 32 from the slider first position to the slider second position (the position shown in FIG. 2) by pressing on a thumb button 44. The thumb button 44 is formed of any suitable size, shape and design (shown in FIG. 2 to be rectangularly shaped and extruding from the slider 32) and is configured to be pressed by the operator's thumb to engage and disengage the device 10. In one embodiment of the invention, the thumb button 44 immediately returns to its original position after being released. In another alternative embodiment of the invention, the thumb button 44 remains in a partially compressed position after being released and while the slider 32 remains in the slider second position. In yet another embodiment of the invention, thumb button 44 may only be pressed when the clutch/brake lever 14/16 is in the retracted position.

Figure 12:
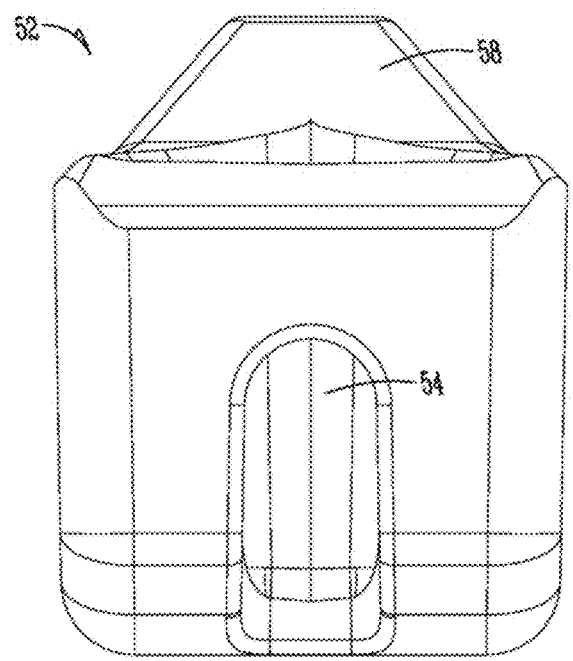
FIG. 12 shows a front view of one embodiment of an end spacer of one embodiment of the present invention.

In order for the slider 32 to move back and forth and to engage the notch 27, the length of the slider rail 48 must be less than the distance between the notch 27 to the end 31 of the channel 28. The actuation of slider 32 causes the slider's rails 48 to slide through the channel 28 toward a slider second position as shown in FIG. 2. In the slider second position, the slider 32 is rotated about the clamp to a location where the rail 48 is engaged by the notch 27. In the slider second position, the lever retention extension 46 is extended to the lever retention extension second position to retain the motorcycle lever 14/16 in the secured position. In order to ensure that the lever retention extension 46 maintains the lever 14/16 in the secured position, lever retention extension additions 52 are preferably provided, as shown in FIGS. 3 and 12.

These additions 52 are slidably secured over the tip of the lever retention extension 46 by a snap fit notch 50 and groove 54 arrangement. The groove 54 or slot on the addition 52 fits over and snaps around the notch 50 or ramp on the lever retention extension 46 to secure the addition 52 as part of the lever retention extension 46. In this manner, the lever retention extension addition 52 can quickly and easily add thickness to the lever retention extension 46 to adjust the distance of the gap 56 between the lever retention extension 46 and the handlebar 12 and to retain the lever 14/16 further against the handlebar 12. As shown in FIG. 3, a variety of additions 52 with a variety of extensions 58, as shown in FIG. 12, can be provided to ensure that the lever retention extension 46 retains the lever 14/16 as much as desired.

Preferably, as shown in FIG. 3, the device 10 is sold with a plurality of spacers 60 of various thickness to adjust to a variety of handlebar 12 diameters and a plurality of lever retention extension additions 52 to provide a variety of lever retention positions. These may all be sold together as a universal kit that can be used by a rider to fit a variety of motorized vehicles.

The slider 32 is maintained in the slider second position until the rider presses the thumb button 44 again to lift the slider rail 48 from the notch 27. In the alternative embodiment of the invention where the thumb button 44 remains in a partially compressed position while the slider is in the slider second position, the thumb button 44 will return to its original position.

Figure 13:
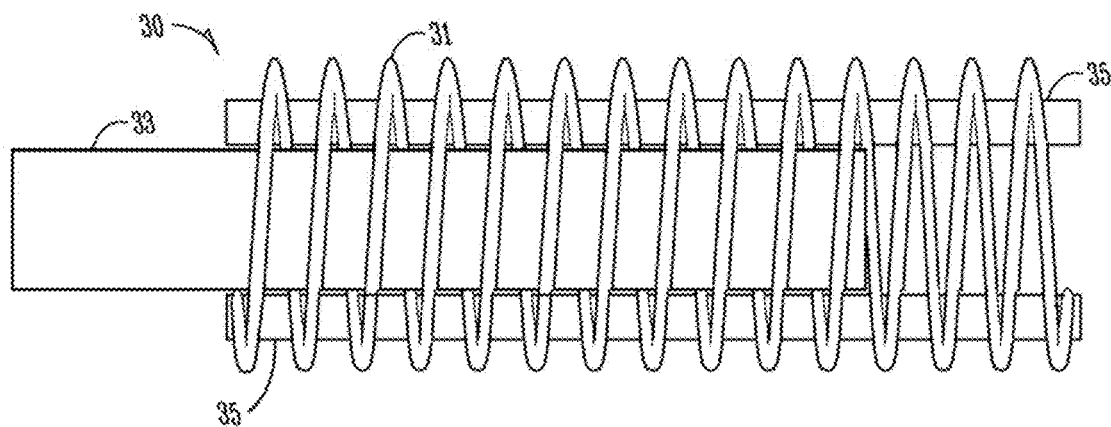
FIG. 13 shows a perspective view of the solenoid assembly according to one embodiment of the present invention.

A solenoid coil 31 of solenoid assembly 30 is maintained in a groove 28 as shown in FIG. 5 and secured about a solenoid post 29 as shown in FIG. 6. The solenoid assembly 30 may comprise a solenoid coil 31, a bobbin 35, and a bolt 33 as shown in FIG. 13. The solenoid coil 31 may include one or more windings of conductive wire. In the exemplary embodiments illustrated in FIGS. 5 and 13, the solenoid coil 31 has a single winding. The solenoid coil 31 can be wound about a bobbin 35 comprised of a non-conductive material. Thus, the bobbin 35 is coaxially disposed between the solenoid coil 31 and the bolt 33.

The present disclosure contemplates bolt 33, but one of ordinary skill in the art would understand that the bolt 33 could potentially be substituted for any magnetically conductive material that aids converting energy into linear motion in solenoid assembly 30. In an exemplary embodiment, the bolt 33 is a magnetically conductive material and is elongated, rod-shaped, or cylindrical.

The bolt 33 may have an actuated position and a biased position. When the slider 32 is in the slider first position, the bolt 33 is in the biased position at least partially outside solenoid coil 31. When the slider 32 is moved into the slider second position, the bolt 33 is magnetically actuated and moves towards the solenoid post 29 and into the actuated position. In some embodiments of the invention, the bolt 33 moves completely inside solenoid coil 31 when the bolt 33 is in the actuated position. While the bolt 33 is in the actuated position, a biasing mechanism, such as a spring, a gravitational force, a magnetic force, or the like, attempts to move the slider 32 back to the slider first position.

Additionally, when the slider 32 is in the slider second position, the notch 27 in the channel 26 is used to counter the spring force applied by the biasing mechanism while the slider 32 is in the slider second position. Then, only until the rider pushes thumb button 44 will the rail 48 becomes dislodged from the notch 27, allowing the spring 30 to force the slider 32 back into the slider first position.

By having the slider 32 located on the bottom portion of the clamp 18, gravity will also contribute to rotating the slider 32 back and out of a secured position. Additionally, if the biasing mechanism should fail when the slider rail 48 is moved out of the notch 27, any pressure from the lever 14/16 will help to push the lever retention extension 46 down and away, moving the slider 32 back to the slider first position. All of these forces help ensure the release of the lever 14/16 from the lever retention extension 46 and ensures the lever 14/16 can freely move from a restrained to an extended position. Thus, this arrangement ensures safety by providing a number of ways to move the slider 32 from the slider second position back to the slider first position.

Figure 15:
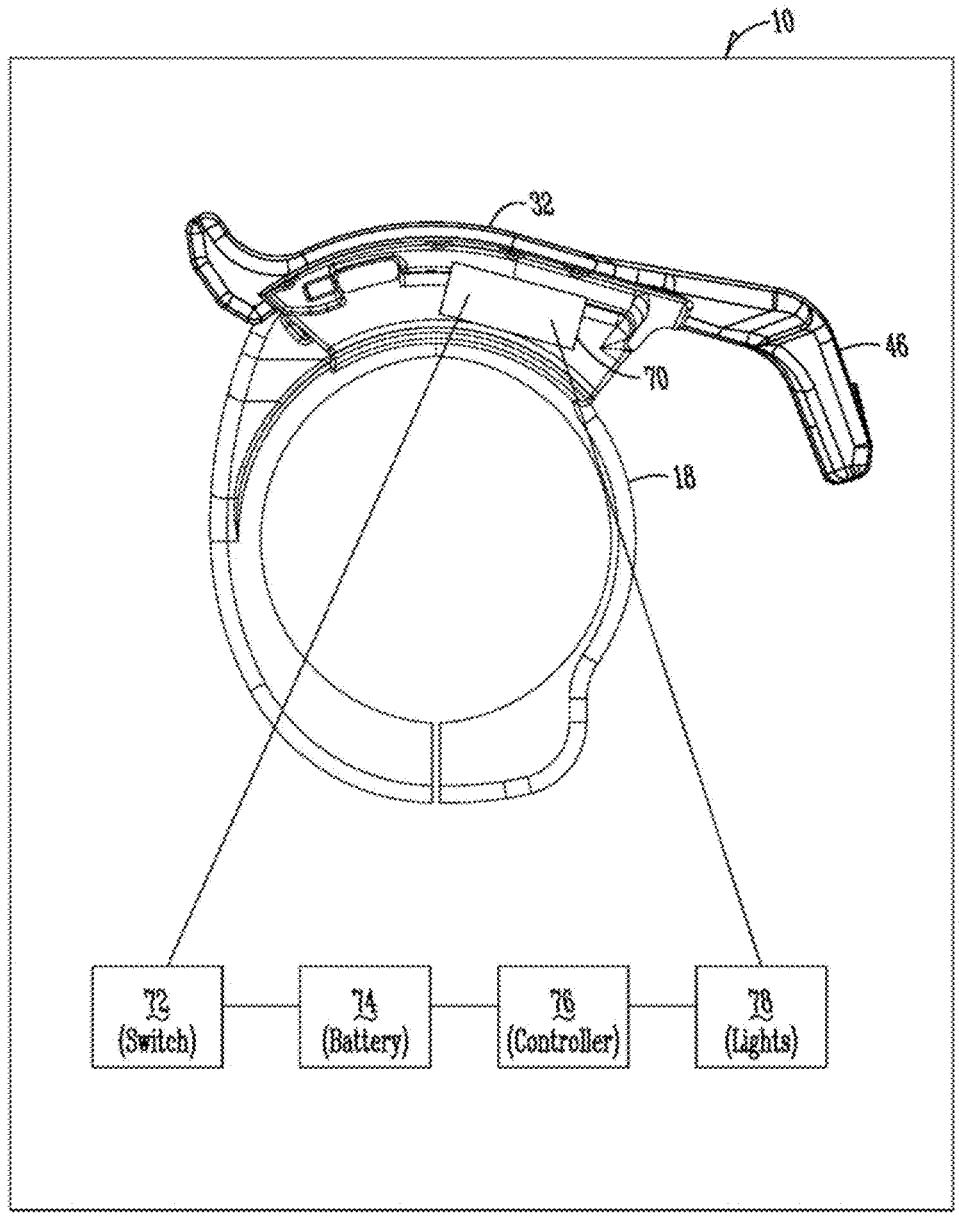
FIG. 15 shows a side view of the device of FIG. 1 using an electro mechanical arrangement.

FIG. 15 shows the device 10 using an electro mechanical arrangement comprising an electro mechanical mechanism 70. While the use of a solenoid assembly 30 for the electro mechanical mechanism 70 is contemplated, it should be noted that other electro mechanical mechanisms can be used. For example, in an alternative embodiment of the invention, electro mechanical mechanism 70 may comprise a servo, a motor and gear assembly, magnetics, or any other transducer device capable of converting energy into linear motion to move the slider from a slider first position to a slider second position. In one embodiment of the invention, the slider 32 may be moved between a slider first and slider second position by electro mechanical mechanism 70 connected to an electronic circuit, typically consisting of a switch 72 operatively (e.g. electrically, electro mechanically, mechanically, hydraulically, etc.) connected to the thumb button 44, a power source or battery 74, a controller 76 and an indicator light or lights 78. When current is applied, the electro mechanical mechanism 70 moves the slider 32 from the slider first position to the slider second position.

In an embodiment of the invention where the solenoid assembly 30 is utilized as the electro mechanical mechanism 70, turning the power source or battery 74 on via the switch 72 will cause electric current to travel through the solenoid coil 31 and magnetically actuate the bolt 33. The solenoid assembly 30 generally includes the components required to receive an electrical input to magnetically actuate the bolt 33. Additionally, as is commonly known in the art, the solenoid coil 31 may be energized via wire leads (not shown).

Figure 16:
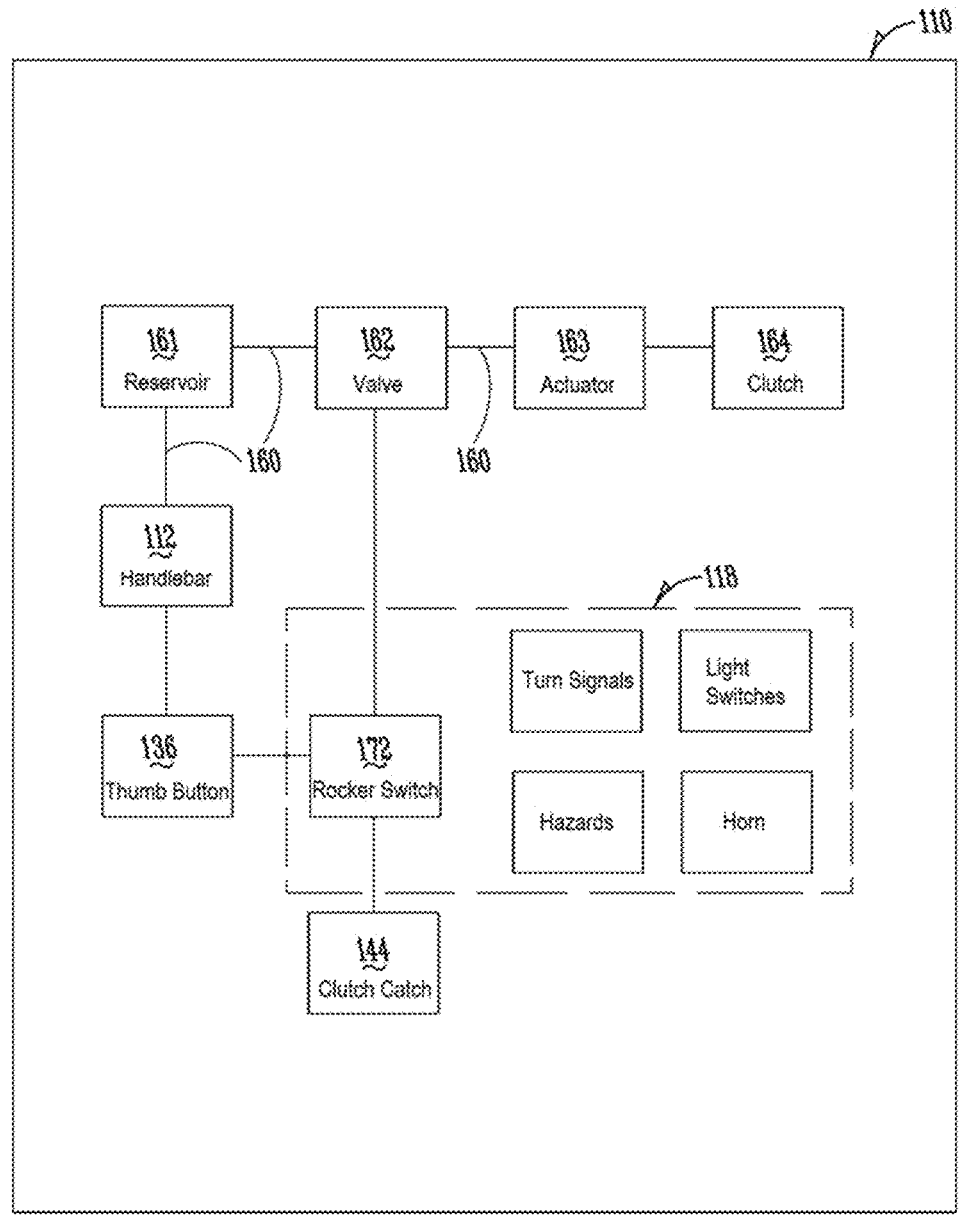
FIG. 16 shows a schematic of a clutch/brake assistance system according to one embodiment of the present invention.

In another embodiment of the invention, a clutch or brake assistance system and method of use 110 (system 110) is presented and shown in FIG. 16. System 110 comprises a collar 130 with a thumb button 136, clutch/brake levers 120/121, a clutch/brake catch 144/145, at least one rocker switch 172, hydraulic lines 160, and at least one pneumatic or hydraulic valve 162.

Figure 17:
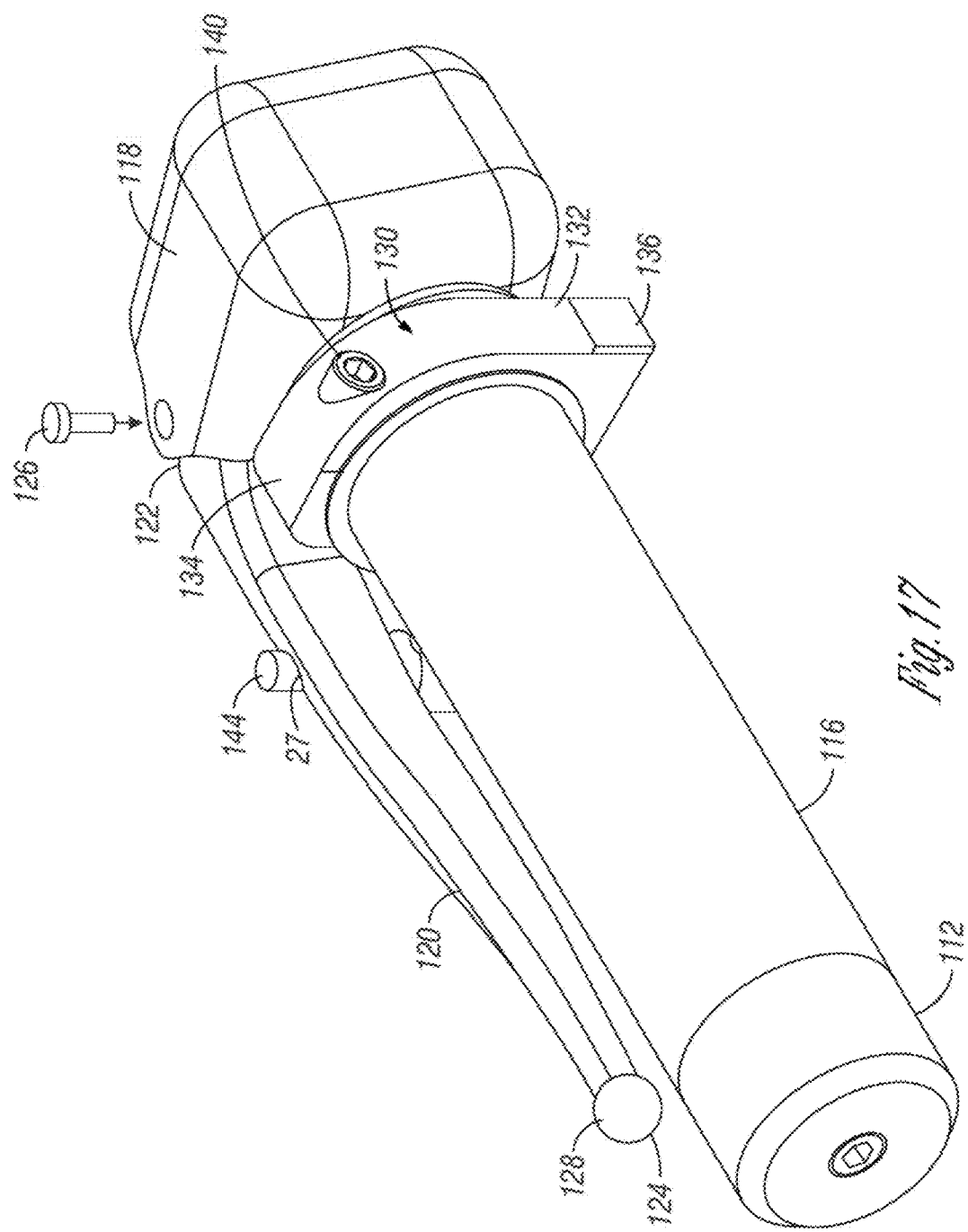
FIG. 17 shows a perspective view of an alternative embodiment of the present invention.

Thumb buttons 136 are formed of any suitable size, shape and design (shown in FIG. 17 to be rectangularly shaped and positioned so that the thumb button 136 is flush with the exterior surface of the interior collar 132 while the thumb button is in its original position) and are configured to be pressed by the operator's thumb to engage and disengage the system 110. In one embodiment of the invention, the thumb button 136 immediately returns to its original position after being released. In another alternative embodiment of the invention, the thumb button 136 remains in a partially compressed position after being released and while the slider 32 remains in the slider second position. In yet another embodiment of the invention, the thumb button 136 is rigidly kept in its original position so that the thumb button 136 may only be pressed when the corresponding clutch/brake lever 14/16 is in the retracted position.

Clutch/brake levers 120/121 are configured to operate a clutch 164 or brake 166 of motorcycle 114. When the brake lever 121 is pulled towards the handlebar 112 in a retracted position, a brake 166 is engaged, causing the motorcycle 114 to brake. Thus, so long as pressure is maintained on the brake lever 121, the motorcycle 114 remains in a braked condition. Similarly, but conversely, when the clutch lever 120 is away from the handlebar 112 in a released position, the clutch 164 is engaged, allowing the motor to engage the transmission and ultimately turn a wheel of the motorcycle 114.

The clutch/brake catches 144/145 are configured to engage and hold the clutch/brake levers 120/121 in a retracted position.

Each rocker switch 172 may be operatively (electronically, electro mechanically, mechanically, hydraulically, or otherwise) connected to the thumb button 136, the clutch/brake catch 144/145, and the pneumatic or hydraulic valve 162. Furthermore, the rocker switch 172 may be toggled such that when thumb button 136 is pressed and released, the clutch/brake catch 144/145 and the pneumatic or hydraulic valve 162 are actuated to change positions until the thumb button 136 is pressed again.

Hydraulic lines 160 hydraulically and operatively connect the clutch/brake levers 120/121 to the clutch/brakes 164/166. Hydraulic lines 160 may contain hydraulic fluids (e.g. fluids based on water or mineral oil), a mix of different hydraulic fluids, or any other type of relatively incompressible fluids.

The pneumatic or hydraulic valves 162 may be inserted inside hydraulic lines 160 between a hydraulic reservoir 161 and a hydraulic actuator 163. The pneumatic or hydraulic valves 162 may be configured to prevent movement of hydraulic fluid between the hydraulic reservoir 161 and hydraulic actuator 163 in order to keep the brakes engaged or the clutch disengaged. In other embodiments of the invention, the pneumatic or hydraulic valves 162 may also be configured to release, dose, distribute or mix hydraulic fluids of hydraulic lines 160. One of ordinary skill in the art would also recognize that pneumatic or hydraulic valves 162 could be substituted for a manual valve, an electrical valve (such as a solenoid), or any other type of valve currently used to interrupt flow of hydraulic fluids.

Each component of the system 110 may be retrofit in order to be easily installed on motorcycle 114 and the components of system 110 may be sold separately or as a kit.

In the preferred use of system 110, a rider will hold the clutch/brake lever 120/121 in place and press the thumb button 136 to toggle rocker switch 172. Toggling the rocker switch 172 allows the pneumatic or hydraulic valve 162 to prevent movement of any hydraulic fluid in the hydraulic lines 160. This effectively holds the clutch/brakes 164/166 in place and allows the rider's hands to be free from the clutch/brake lever 120/121 as desired. The pneumatic or hydraulic valve 162 maintains the rider's desired clutch or brake position until the rider presses the thumb button 136 again, which would allow movement of hydraulic fluid within hydraulic lines 160 and allow the rider to selectively engage the clutch 164 or brakes 166 by holding or releasing the clutch/brake levers 120/121.

Figure 18:
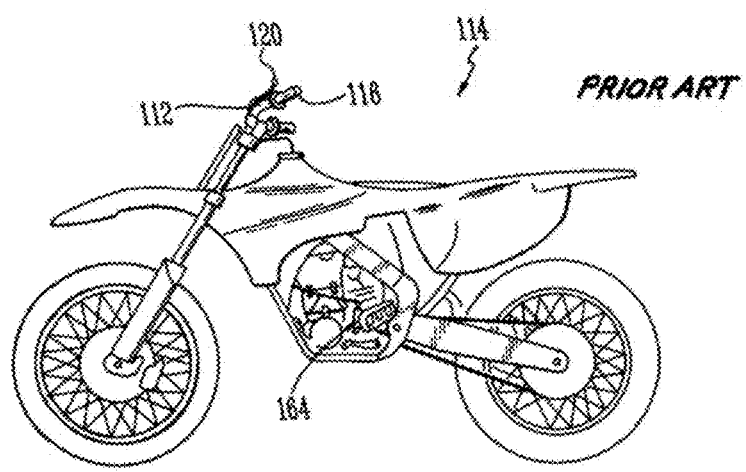
FIG. 18 shows a conventional motorcycle with a clutch.

System 110 may be used in conjunction with a left handlebar 112 of any conventional motorcycle 114 with a clutch lever 120 and a clutch 164. As one of countless examples, the conventional motorcycle 114 may be a YAMAHA YZ400FK1 motorcycle, such as the one depicted in FIG. 18 and U.S. Pat. No. 6,227,342 to Ambruster et al.

Referring back to FIG. 17, the handlebar 112 includes a grip 116 and a control housing 118. A clutch lever 120 is pivotally connected to the control housing 118 and pivots between a biased extended position wherein the clutch 164 is fully engaged, and a retracted position wherein the clutch 164 is fully disengaged. In the extended position, clutch lever 120 is as far away from the handlebar 112 and grip 116 as possible. In the retracted position, clutch lever 120 is as close to handlebar 112 and grip 116 as possible.

Handlebar 112 is any form of any suitable size, shape and design and is configured to be held by the operator and use for steering. In the arrangement shown, as one example, handlebar 112 is a generally tubular member that is bent and curved to serve its intended purpose. The grip 116 and control housing 118 are mounted to handlebar 112.

Grip 116 is formed of any suitable size, shape and design and is configured to provide a comfortable and convenient grip for the operator to hold. In the arrangement shown, grip 116 is positioned over handlebar 112 at the outward end of handlebar 112.

Control housing 118 is formed of any suitable size, shape and design and is configured to hold and house various components that work to operate and control motorcycle 114. In the arrangement shown, control housing 118 is positioned at the inward end of grip 116. In the arrangement shown, clutch lever 120 pivotally connects to control housing 118 and extends outward in the direction of grip 116. In some arrangements, control housing 118 houses and holds rocker switch 172, light switches, horn buttons, turning signals, hazard signals or any other control for motorcycle 114.

Clutch lever 120 is formed of any suitable size, shape and design and is configured to operate a clutch 164 of motorcycle 114. In the arrangement shown, clutch lever 120 extends a length from an inward end 122 to an outward end 124. Clutch lever 120 pivotally connects to control housing 18 at or near its inward end 122 at axle 126. Axle 126 is any form of a device that connects clutch lever 120 to control housing 118 and allows pivotal rotation thereon. Clutch lever 120 includes a feature 128 positioned at the outward end 124 that indicates the end of clutch lever 120 to an operator and helps to prevent end of clutch lever from slipping off of the operator's hand. Clutch lever 120 arcs, bends and curves in any arrangement as it extends from inward end 122 to outward end 124. In an extended position (clutch 164 engaged), clutch lever 120 is positioned at an angle to and a distance away from grip 116 and handlebar 112; whereas in a retracted position (clutch 164 disengaged), clutch lever 120 is positioned substantially closer and in approximate parallel spaced alignment to grip 16 and handlebar 112.

Most if not all motorcycles 114 do not include a clutch/brake assistance system 110 that helps to hold the clutch/brake lever 120/121 in a retracted position. As such, there are millions and millions of motorcycles 114 that have been manufactured that are the target market for the system 110. As such, system 110 is configured to be installed on practically any motorcycle 114 without substantial modifications to the motorcycle 114 and without interfering with the other systems or configuration of motorcycle 114.

The clutch assistance system, system 110, is formed of any suitable size, shape and design and is configured move between an engaged position and a disengaged position. In an engaged position, system 110 holds clutch lever 120 at its most inward position (wherein the clutch lever 120 is in its retracted position where the clutch 164 disengaged). In a disengaged position, system 110 is free from interference with clutch lever 120 and allows clutch lever 120 to return to its biased extended position where the clutch 164 is engaged. In one arrangement, as is shown, system 110 is formed of a collar 130, which is itself formed of an interior collar 132 and an exterior collar 134, a thumb button 136, a first shaft 138, a second shaft 140, a first nut 142, a clutch catch 144, and a second nut 146, among other components.

Figure 19:
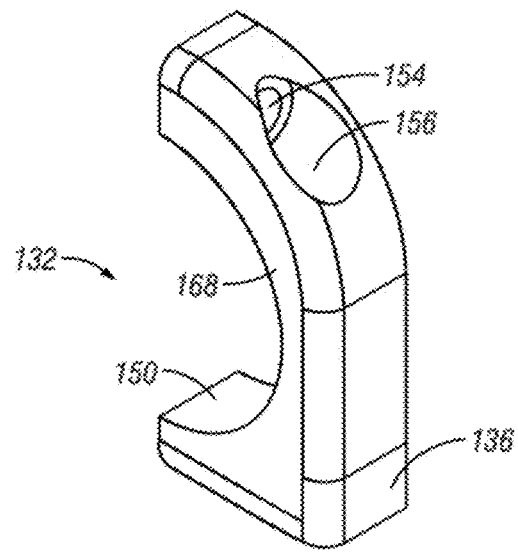
FIG. 19 shows a perspective view of one half of a collar in an alternative embodiment of the present invention.
Figure 20:
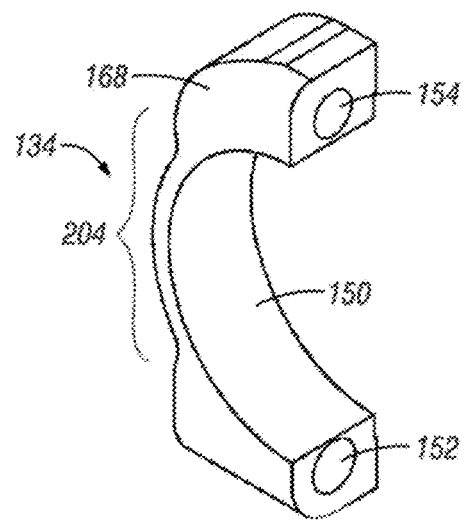
FIG. 20 shows a perspective view of another half of a collar in an alternative embodiment of the present invention.
Figure 21:
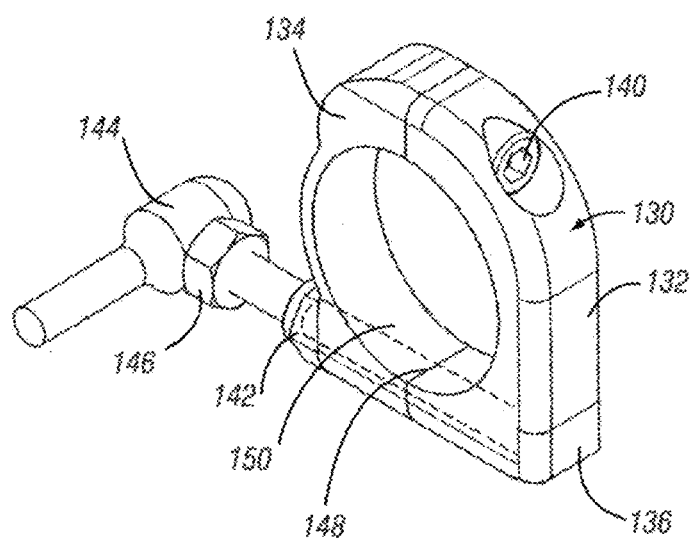
FIG. 21 shows a perspective view of an assembled, but uninstalled alternative embodiment of the present invention.

Collar: Collar 130 is formed of any suitable size, shape and design and is configured to fit around handlebar 112 and/or grip 116 of practically any motorcycle 114 and tightly affix thereto without modification of the motorcycle 114. In the arrangement shown, collar 130 is itself formed of two components, an interior collar 132 (shown in FIG. 19) and an exterior collar 134 (shown in FIG. 20) that join together along a seamline 148, as shown in FIG. 21. As most motorcycle handlebars 112 and grips 16 are circular in nature, interior collar 132 and exterior collar 134 together form an interior surface 150 that is generally circular in nature and is sized and shaped to fit standard motorcycle handlebar 112 and grip 116 sizes. In one arrangement, seamline 148 extends through approximately the middle of the circle formed by interior surface 150 and as such both the interior collar 132 and exterior collar 134 cover approximately half of the circumference of handlebar 112 and grip 116.

The lower end of interior collar 32 and exterior collar 134 include a bore 152 that extends through the lower end of interior collar 132 and the lower end of exterior collar 134 when the two components are aligned around handlebar 112 and/or grip 116. Bore 152 is sized and shaped to receive and allow first shaft 138 to extend therethrough. Bore 152 is generally circular in shape so as to allow rotation of first shaft 138 within bore 152. First shaft 138 is sized and shaped to extend through and fit within bore 152 with close and tight tolerances which allow rotation of first shaft 138 within bore 152 but do not allow for excessive movement within bore 152. When bore 152 of interior collar 132 and exterior collar 134 are aligned around handlebar 112 and/or grip 116, first shaft 38 pulls the interior collar 132 and exterior collar 134 together thereby tightening the lower end of collar 130 around handlebar 112 and/or grip 116. In one arrangement, the entire length of bore 152 is smooth, whereas in contrast in other arrangements all or a portion of bore 152 is threaded and meshes with threads on first shaft 138.

The upper end of interior collar 132 and exterior collar 134 include a bore 154 that extends through the upper end of interior collar 132 and the upper end of exterior collar 134 when the two components are aligned around handlebar 112 and/or grip 116. Bore 154 is sized and shaped to receive and allow second shaft 140 to extend therethrough. Bore 154 is generally circular in shape so as to allow rotation of second shaft 140 within bore 154. Second shaft 138 is sized and shaped to extend through and fit within bore 154 with close and tight tolerances which allow rotation of second shaft 140 within bore 154 but do not allow for excessive movement within bore 154. When bore 154 of interior collar 132 and exterior collar 134 are aligned around handlebar 112 and/or grip 116, second shaft 140 pulls the interior collar 132 and exterior collar 134 together thereby tightening the upper end of collar 130 around handlebar 112 and/or grip 116. In the arrangement shown, to facilitate tightening of the interior collar 132 to the exterior collar, the portion of bore 154 within the interior collar 132 is smooth whereas the portion of bore 154 within exterior collar 134 is threaded. In this arrangement, the exterior end of second shaft 140 includes a threaded portion that threadably meshes with the threads in the bore 154 of exterior collar 134 such that when the second shaft 140 is rotated, this threaded engagement tightens interior collar 132 to exterior collar 134.

In the arrangement shown, the interior end of bore 154 within interior collar 132 includes a stepped portion 156 that has a larger diameter than the other portions or more exterior portions of bore 154. This stepped portion 156 is sized and shaped to receive a head 158 of second shaft 140 within close and tight tolerances. Head 158 is larger in diameter than the shaft 60 of second shaft 140 and as such the stepped portion 156 of bore 154 receives head 158 therein but prevents the passage of head 158 therethrough. This provides a more finished appearance, a smoother exterior surface and it eliminates edges that could catch on an operator's hands or clothing. Upon tightening second shaft 140 within bore 154, the threaded engagement of the exterior end of second shaft 140 with the threaded portion of exterior collar 134 pulls the two collars 132, 134 as the head 158 is prevented from passing stepped portion 156.

Exterior collar 134 is formed of any suitable size, shape and design. The upper end of exterior collar 134 includes bore 154 which includes threads or a threaded section that is sized and shaped to threadably engage a threaded section of second shaft 140 thereby allowing tightening between interior collar 132 and exterior collar 134. The lower end of exterior collar 134 includes bore 152 which is sized and shaped to allow the passage of first shaft 138 therethrough.

A first nut 142 is connected to first shaft 138 just outside of bore 152. This first nut 142 is tightened against the exterior surface of exterior collar 134 thereby tightening the lower ends of interior collar 132 and exterior collar 134 together. In one arrangement, as it is undesirable for the first nut 142 to loosen over time, first nut 142 is a lock nut, also known as a nylock nut which has a nylon or other composite piece therein that helps to prevent unintentional loosening between first nut 142 and first shaft 138. In an alternative arrangement, on or more washers or lock washers are used between the exterior surface of exterior collar 34 and the interior surface of first nut 142 to prevent unintentional loosening between first nut 142 and first shaft 138.

Second nut 146 is positioned on first shaft 138 and is positioned a distance away from first nut 142. Like first nut 142 it is undesirable for second nut 146 to unintentionally loosen and for this reason, in one arrangement second nut 146 is a lock nut, also known as a nylock nut which has a nylon or other composite piece therein that helps to prevent unintentional loosening between second nut 146 and clutch catch 144 to which second nut 146 is engaged. In an alternative arrangement, on or more washers or lock washers are used between the exterior surface of second nut 46 and the interior surface of clutch catch 44 to prevent unintentional loosening between second nut 46 and clutch catch 144.

Figure 22:
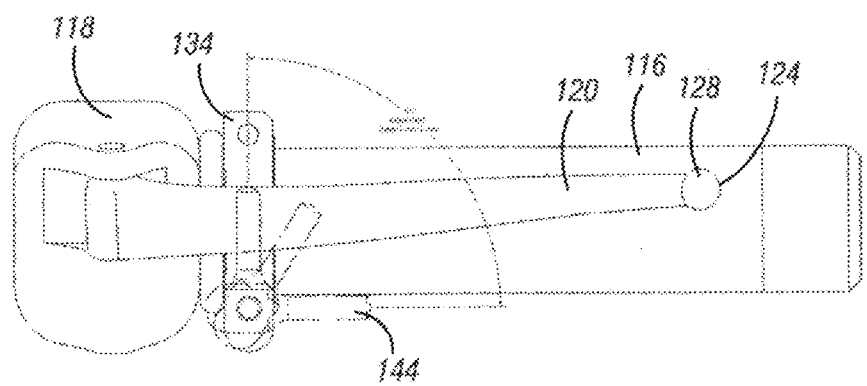
FIG. 22 shows a side view of an alternative embodiment of the present invention installed and in a plurality of positions.
Figure 23:
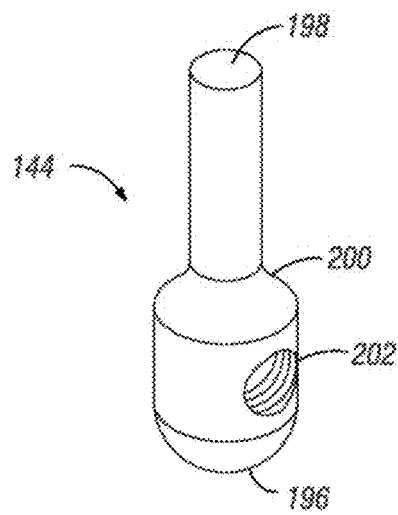
FIG. 23 shows a perspective view of a clutch catch upper end of another alternative embodiment of the present invention.

Clutch catch 144 is formed of any suitable size, shape and design and is configured to engage and hold clutch lever 120 in a retracted and disengaged position as shown in FIG. 22. In the arrangement shown in FIG. 23, clutch catch 144 extends from a lower end 196 to an upper end 198. Both the lower end 196 and the upper end 198 are generally cylindrical in shape with the lower end 196 having a substantially larger diameter than the upper end 198. The larger diameter lower end 196 smoothly connects to the smaller diameter upper end 198 at a curved section 200. The lower end 196 terminates in a rounded end at its lower most end and includes a bore 202 slightly above its end. In one arrangement, as is shown, bore 202 is threaded and is sized and shaped to threadably engage the threads on the outward end of first shaft 138.

Clutch catch 144 is installed on the exterior threaded end of first shaft 138 after first nut 142 and second nut 146 are installed thereon. Next, the angle and distance of clutch catch 144 are set by rotating the clutch catch 144 over the threaded portion of first shaft 138. Once the desired position is set the second nut 146 is tightened against the interior surface of the clutch catch 144 thereby locking the two components together.

The exterior side of exterior collar 134 includes a narrow band section 204. When clutch lever 120 is in a fully retracted position and the clutch is disengaged, the clutch lever is pulled to within close distances of handlebar 112 and/or grip 116. To provide needed clearance between the interior surface of clutch lever 120 and handlebar 112 and/or grip 116 band section 204, which is positioned between the upper end and lower end of exterior collar 134 is relatively thin thereby providing as much clearance as possible for clutch lever 120 to be pulled in tight against handlebar 112 and/or grip 116.

To provide an improved aesthetic appearance, reduce the material needed to form system 110, and to smooth the device 110 so as to prevent an operator from catching their clothing or a finger on the system 110, where possible the corners and edges of the system 110 are rounded or chamfered. This is particularly evident in the outside edges and corners of interior collar 132 and exterior collar 134.

To accommodate handlebar 112 and/or grip 116 of various sizes a spacer 206 may be used. Spacer 206 is formed of any suitable size, shape and design and is configured to modify the size of the handlebar 112 and/or grip 116 to fit within the interior surface 150 of collar 130. In one arrangement, as is shown, spacer 206 is a generally circular collar that is flexible and can be placed over handlebar 112 and/or grip 116 thereby increasing the diameter of handlebar 112 and/or grip 116. Spacer 206 can also include a lip positioned at either or both of the interior edge and the exterior edge of the spacer 206 so as to help maintain the collar 130 within the spacer 206.

Grip Extension: the side 168 to side 168 width of collar 130 takes up valuable space on the handlebar 112 and/or grip 116. To compensate for this, in some arrangements it is desirable to install a grip extension at the end of handlebar 112.

In Operation: The system 110 is installed on motorcycle 114 by placing interior collar 132 on the interior side of handlebar 112 and/or grip 116 and placing exterior collar 134 on the exterior side of handlebar 112 and/or grip 116. Next, the bores 152 and 54 of the collars 132 and 34 are aligned. Once aligned, second shaft 140 is inserted through the bore 154 in the upper end of interior collar 132 and it is rotated until the threads of second shaft 140 pull the interior collar 132 and exterior collar 134 together. In this position the head 158 of second shaft 140 is situated within the step 156 in the upper end of interior collar 132.

The first shaft 138 is inserted through the bore 152 in the lower end of interior collar 132 and exterior collar 134. Next, the first nut 142 is positioned over the first shaft 138 followed by the second nut 146 followed by the clutch latch 144.

Once assembled in this manner, the position of the clutch latch 144 is adjusted for both lateral distance away from the handlebar 112 and/or grip 116 as well as for angle. Once the proper lateral distance and angle are set by a combination of rotating clutch latch 144 on first shaft 138 and rotating first shaft 138 within collar 130, the first nut 142 is tightened against the exterior surface of the exterior collar 134 and the second nut 146 is tightened against the clutch catch 144 thereby locking the arrangement between the components.

The system 110 is properly adjusted when the clutch catch 144 tightly engages the clutch lever 120 and holds it tightly in a retracted position where the clutch is disengaged.

In use, when the operator is slowing down and stopping at a stop light, train crossing or other situation that requires the operator to wait for an extended period of time, the operator grasps the clutch lever 120 with their left hand and pulls the clutch lever 120 all the way in thereby disengaging the clutch. Next, the operator pushes the thumb button 136 with their thumb. In doing so, the operator has moved the clutch catch 144 from sideways position where it does not interfere with the clutch lever 120 to an upward or vertical position where the clutch catch 144 is now position outward of the clutch lever 120 and is in engagement with the clutch lever 120 thereby holding it in the retracted position.

Once the system 110 is engaged because thumb button 136 was pressed and the clutch catch 144 is in a vertical position, the clutch lever 120 is held in a retracted position and the operator can release their grip on the clutch lever 120 and use their left hand for anything they desire.

Once the operator is ready to drive away again, the operator simply re-grasps the clutch lever 120 and pulls it close to the handlebar 112 and/or grip 116 thereby releasing the pressure on the clutch catch 144. Once the clutch lever 120 is in the operator's control the operator pushes the thumb button 136 with their thumb again. In doing so, the operator has moved the clutch catch 144 from a vertical position where it interferes with the clutch lever 120 to a sideways position where the clutch catch 144 is now out of the way of the clutch lever 120. Once in thumb latch 136 and clutch catch 144 is in this position, the operator can again resume operation of the motorcycle 114.

This use of system 110 allows an operator to hold the clutch lever 120 in a retracted position without having to dedicate their left hand to doing so. This obviates the need to shift out first gear and this allows the user to accelerate faster as they do not have to shift before releasing the clutch.

Detents: To provide an added level of protection, detents can be used to maintain the system in either or both of the disengaged position and the engaged position. In one arrangement, a detent is placed within the exterior surface of clutch lever 120. This detent is a simple recess in the exterior surface of clutch lever 120 that is sized and shaped to receive clutch catch 144 therein when clutch catch 144 is in a fully engaged position. This detent helps to hold the clutch catch 144 within the detent when it is engaged thereby improving the safety of the system 110.

From the above discussion it will be appreciated that the clutch assistance system and method of use is presented herein improves upon the state of the art.

Specifically, the a clutch assistance system and method of use: improves upon the state of the art; improves safety; reduces operator fatigue; improves the comfort of operation; eliminates the need to hold the clutch in while waiting; is relatively fool proof; allows for faster acceleration after a stop light changes; is relatively inexpensive; is simple to use; can be installed on practically any motorcycle or other power sport vehicle; is adjustable; is easy to manufacture; reduces or eliminates the wait time needed to shift gears; has a robust design; improves the efficiency of riding; can be used on a wide variety of motorcycles and power sport systems; has a long useful life; has a small footprint; is high quality; is durable; does not interfere with the operator or other operations of the motorcycle or power sport system; can be quickly installed; can be easily installed; can be quickly removed; can be easily removed; is adjustable; securely holds the clutch lever in; does not require substantial modification of the motorcycle or power sport system for use; can be installed without permanent alterations to the motorcycle or power sport system; can be installed with conventional tools, among countless other advantages and improvements.

It will be appreciated by those skilled in the art that other various modifications could be made to the device without parting from the spirit and scope of this invention. All such modifications and changes fall within the scope of the claims and are intended to be covered thereby.

What is claimed is:

1. A motorcycle clutch or brake assistance system, the system comprising:
   a button operatively connected to and capable of toggling a switch;
   a clutch or brake lever having a retracted position and an extended, biased position;
   a clutch or brake operatively connected to the clutch or brake lever such that the clutch is disengaged or the brake is engaged when the clutch or brake lever is moved into the retracted position; and
   a solenoid assembly comprising a solenoid coil having one or more windings and capable of magnetically actuating a bolt when an electric current passes through the solenoid coil and a bobbin made from a non-conductive material coaxially disposed between the solenoid coil and the bolt wherein the solenoid assembly is operatively attached to the switch and configured such that when the button is pressed, the switch is toggled causing the solenoid assembly to prevent the clutch from becoming engaged or the brake from becoming disengaged and the clutch or brake lever from moving back into the extended, biased position until the button is pressed again.

2. The system of claim 1, wherein the button is a thumb button located on a collar or clamp, the collar or clamp being attached to a motorcycle handlebar.

3. The system of claim 2, wherein the thumb button has an original position and a partially compressed position, the thumb button remaining in the partially compressed position while the switch is toggled and the clutch is disengaged or the brake is engaged.

4. The system of claim 3, wherein the thumb button is rigidly kept in the original position unless the clutch or brake lever is in the retracted position.

5. The system of claim 1, wherein the switch is a rocker switch.

6. The system of claim 1 further comprising:
   a clamp secured to a motorcycle handlebar, the clamp including the button and an extended portion, the extended portion including a channel and the channel including a notch; and
   a slider including:
      a lever retention extension having a lever retention extension first position and a lever retention extension second position;
      a rail in between a thumb extension and the lever retention extension, the rail having a front end and a rear end; and wherein the rail is slidably secured in the channel to travel in a circumferential direction about the handlebar; and
      wherein the slider has:
         a slider first position about the clamp wherein the rail is not engaged by the notch and the lever retention extension is in the lever retention extension first position wherein the clutch or brake lever is in the extended, biased position; and
         a slider second position about the clamp wherein the rail is engaged by the notch and the lever retention extension is extended to the lever retention extension second position to retain the clutch or brake lever in the retracted position.

7. The system of claim 6 further comprising an addition to the lever retention extension, the addition extending between the lever retention extension and the lever when the slider is in the slider second position.

8. A kit comprising:
   the system of claim 1,
   wherein the kit is retrofitted to a motorcycle.

9. A motorcycle clutch or brake assistance system, the system comprising:
   a button operatively connected to and capable of toggling a switch;
   a clutch or brake lever having a retracted position and an extended, biased position;
   a clutch or brake hydraulically connected to the clutch or brake lever via at least one hydraulic line such that the clutch is disengaged or the brake is engaged when the clutch or brake lever is moved into the retracted position; and
   at least one valve located between a hydraulic reservoir and the clutch or brake, wherein the at least one valve is operatively attached to the switch and configured such that when the button is pressed, the switch is toggled and the clutch or brake lever is maintained in the retracted position and the extended, biased position.

10. The system of claim 9, wherein the at least one valve is selected from the group of an electric valve, a pneumatic valve, a hydraulic valve, a mechanical valve, and any combination thereof.

11. The system of claim 9 further comprising a collar secured to a motorcycle handlebar, the collar including:
    the button; and
    a clutch or brake catch operatively connected to the switch and configured such that the clutch or brake catch engages the clutch or brake lever when the switch is toggled.

12. The system of claim 11, further comprising a control housing mounted to the motorcycle handlebar and wherein the clutch or brake lever is pivotally connected to the control housing.

13. The system of claim 12, wherein the switch is located inside the control housing.

14. The system of claim 11, further comprising:
    a notch in an exterior surface of the clutch or brake lever shaped to receive the clutch or brake catch while the clutch or brake catch engages the clutch or brake lever.

15. A method of maintaining the engagement or disengagement of a clutch or a brake of a motorcycle, the method comprising:
    pressing a thumb button operatively connected to a rocker switch to toggle the rocker switch;
    automatically maintaining a clutch or brake lever operatively attached to the rocker switch in a retracted position while the rocker switch is toggled, wherein the clutch or brake lever is hydraulically connected to the clutch or brake via at least one hydraulic line;
    preventing the clutch of the motorcycle operatively connected to the clutch lever from becoming engaged or preventing the brake of the motorcycle operatively connected to the brake lever from becoming disengaged while the rocker switch is toggled by allowing a valve to prevent movement of hydraulic fluid within the at least one hydraulic line; and allowing a biasing mechanism to return the clutch or brake lever to an extended, biased position while the rocker switch is untoggled.

\* \* \* \* \*